Dec. 26, 1939.  A. C. LINDGREN ET AL  2,184,428
HARROW PLOW
Filed Aug. 17, 1938   3 Sheets-Sheet 1

Inventors
A. C. Lindgren
A. D. Gallagher
By V. F. Lassagne
Att'y.

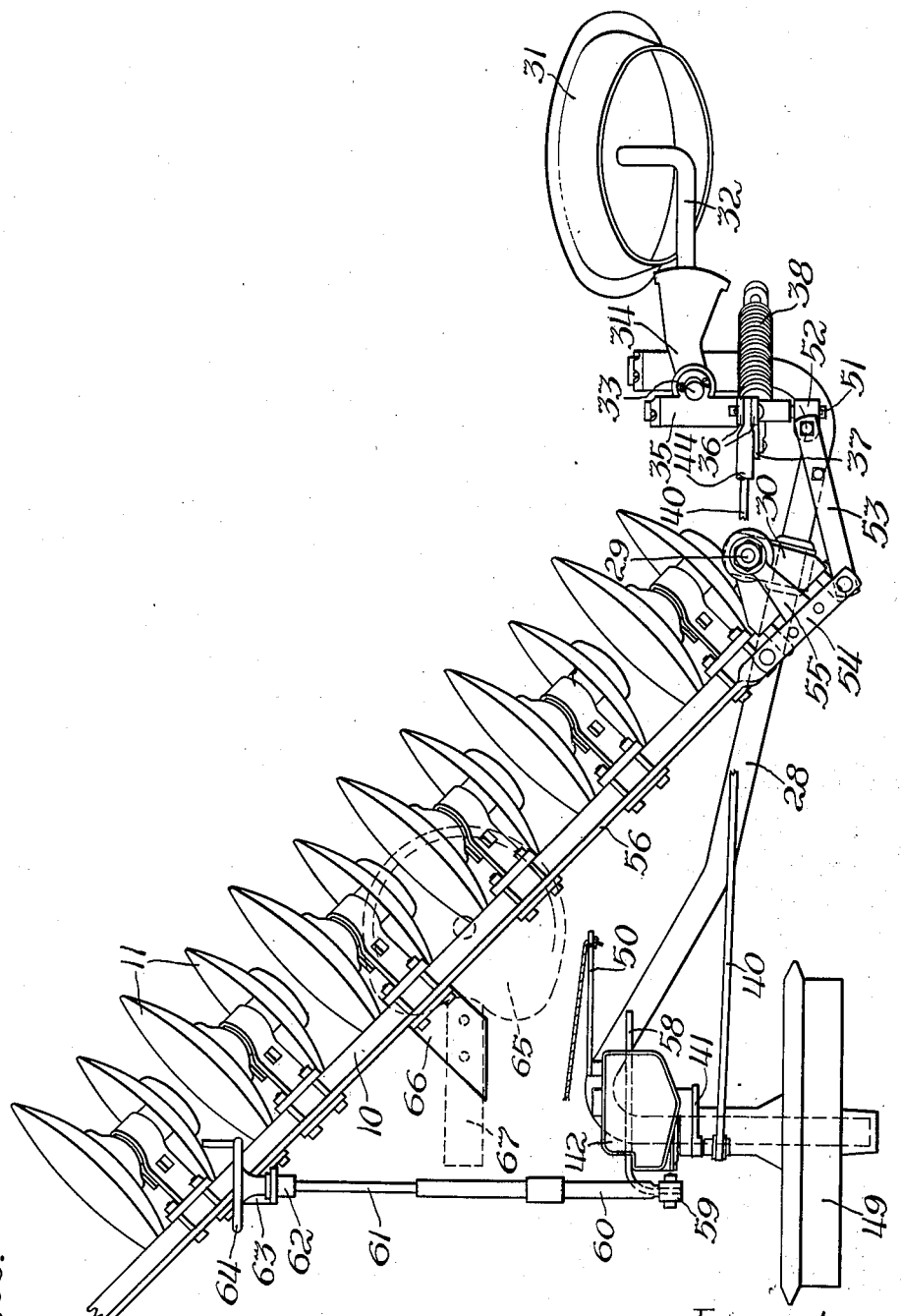

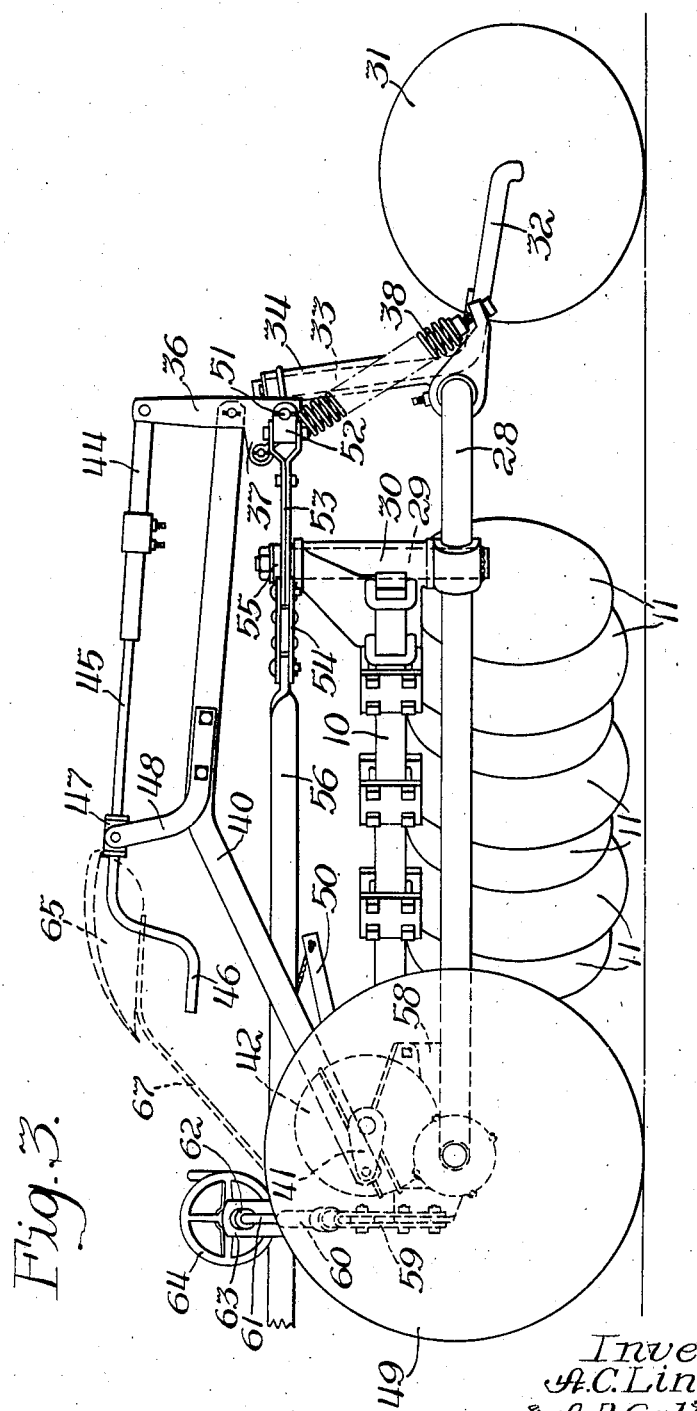

Patented Dec. 26, 1939

2,184,428

UNITED STATES PATENT OFFICE 2,184,428

HARROW PLOW

Alexus C. Lindgren, Chicago, and Arthur D. Gallagher, Canton, Ill., assignors to International Harvester Company, a corporation of New Jersey Application August 17, 1938, Serial No. 225,341

4 Claims. (Cl. 97—72)

This invention relates to a plow. More specifically, it relates to a disk harrow plow in which there is a plow beam supported at the front end by a front furrow wheel and supported at the rear end by means of a structure to which are connected a rear furrow wheel and a land wheel.

In the use of a disk harrow plow, it is often desirable to change the angle of the cut of the plow elements. This should normally be done by a shifting of the rear furrow wheel and land wheel with respect to the plow beam. If these wheels are rigidly mounted with respect to the plow beam, a relative shifting between them is a very difficult operation.

An object of the present invention is to provide an improved plow.

Another object of the invention is the provision of a disk harrow plow with a structure supported by the land wheel and rear furrow wheel which is adjustably secured to the rear end of the plow beam.

A further object of the invention is the provision of a plow in which the angle cut of the plow elements may be changed with facility.

According to the present invention, a plow beam carrying plow elements thereon is supported at one end on a front furrow wheel and at the other end, on a land wheel and a rear furrow wheel. Connection of the land wheel and rear furrow wheel to the plow beam is effected by means of a Z-shaped structure which is pivotally secured to the rear end of the plow beam. An adjustment of the angular position of this Z-shaped structure with respect to the plow beam is had through a screw and sleeve arrangement which is connected at opposite ends to the plow beam and to the Z-shaped structure at points spaced from the point of connection of the Z-shaped structure with the plow beam.

In the drawings—

Figure 2 is a plan view, showing the rear end of the plow; and,

Figure 3 is a side elevation of the rear end of the plow.

Figure 1:
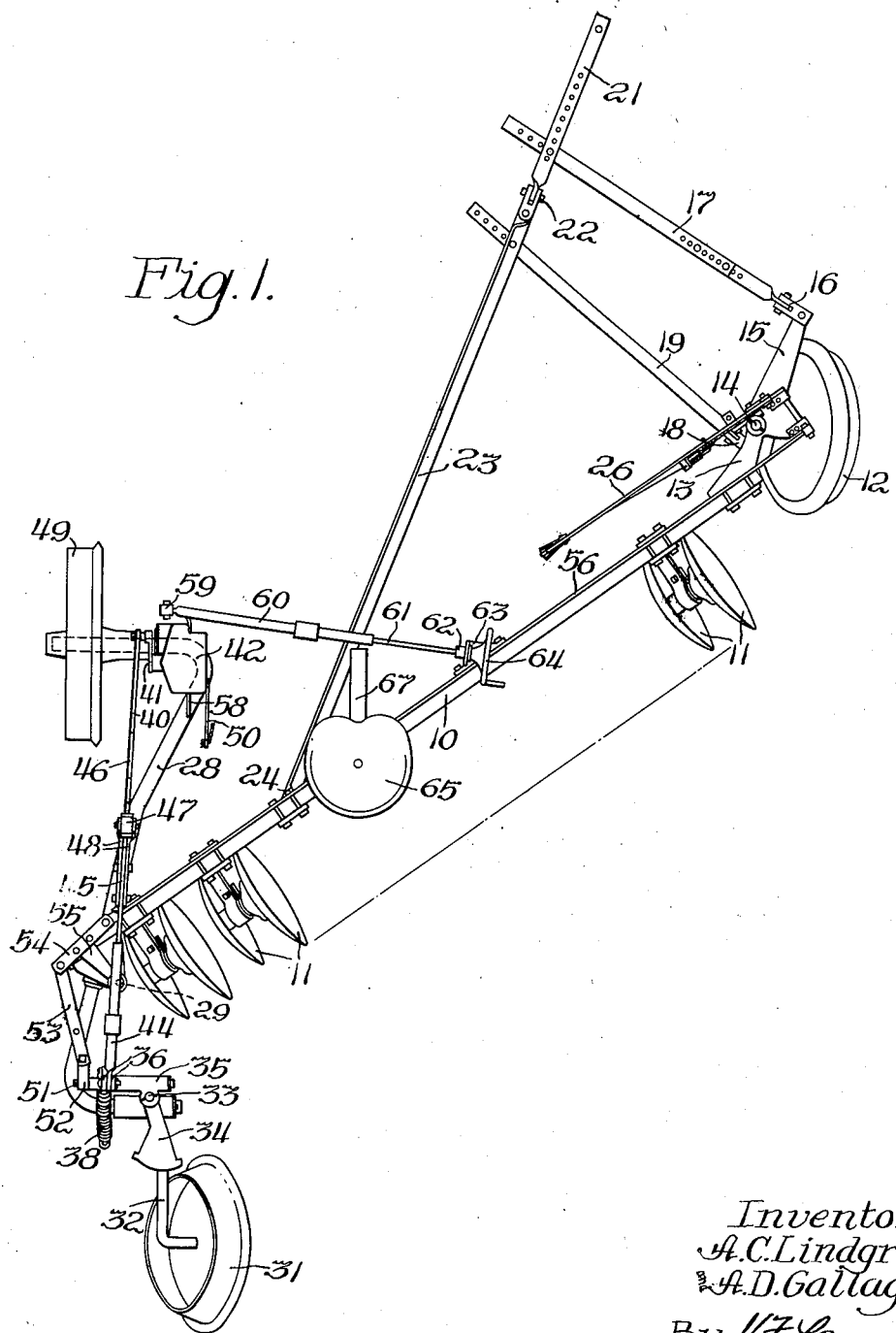
Figure 1 is a plan view of the improved harrow plow.

The plow of the present invention includes a plow beam 10 carrying disk plow elements 11 connected in pairs to the plow beam. A front furrow wheel 12 is secured at the front of the plow beam 10 by means of a casting 13 into which fits an axle 14 connected to the wheel 12. A member 15 is secured to the axle 14 adjacent the wheel 12 and has pivotally attached to it a clevis 16, to which, in turn, is attached an adjustable link 17. A clevis 18 connects the axle 14 and a link 19 extending in approximately parallel relation to the link 17. A member 21 is secured to the link 17 and pivotally connected at 22 to an extended draft member 23, which is, in turn, connected adjacent one end to the link 19 and at the other end, as at 24, near the rear end of the plow beam 10. The parts just described constitute a draft-applying means for the plow, by which the plow may be pulled forwardly as by a tractor, not shown, and may be turned. In turning, a sideward movement of the part 21 causes an angular movement of the arm 15 through the adjustable link 17 and the required turning of the front furrow wheel 12.

Raising of the front end of the plow beam is effected by adjustment of a lever 26 having detent mechanism thereon. The remainder of the parts required for the raising of the front end of the plow beam is not shown nor described, since it forms no part of the present invention and is well understood in the art.

The rear end of the plow beam 10 is supported by means of a Z-shaped structure 28, which has an upstanding spindle member 29 secured thereto and journaled in a casting 30 secured to the rear end of the plow beam. At the rear end of the Z-shaped member 28 is a rear furrow wheel 31 mounted upon an axle 32 having an upstanding portion 33. The portion 33 extends within a sleeve member 34 secured to the end of the Z-shaped member. The sleeve member 34 has a transverse sleeve portion 35. A pair of links 36 are connected to the upper end of the sleeve member 34 and to one of these links is attached an ear 37. A spring 38 connects the ear 37 and a portion of the sleeve 33. Secured between the links 36 at an intermediate portion thereof is an extended member 40 which has its opposite end connected to a crank member 41 associated with a power lift mechanism 42. Connected to the upper end of the links 36 is a sleeve 44, into which is threaded the end of a rod 45 having a handle 46. The rod is fixed longitudinally against movement within a collar 47 supported by the pieces 48 secured to the sides of the extended member 40. The power lift mechanism 42 is positioned adjacent a land wheel 49 secured at the front end of the Z-shaped member 28. This mechanism is of a well known type and will not be further described here, except to state that it is operated by the rotation of the land wheel 49 upon actuation of a lever 50.

A shaft 51 extends through the transverse sleeve portion 35 and has secured thereto by means of a collar 52 a link 53 to which is in turn connected another link 54 supported by a bearing member 55 journaled upon the upper end of the spindle 29. The link 54 is connected to a long link 56, which extends the length of the plow beam to a connection with the lifting mechanism at the forward end of the beam. Depth adjustment of the rear end of the plow beam is effected by a turning of the rod 45 by means of the handle 46. As this is done, the sleeve 44 moves lengthwise with respect to the rod 45 and causes an angular movement of the links 36 and sleeve 33 about the end of the Z-shaped member 28 as a pivot. Thus, an angular movement of the axle 32 is effected to produce a consequent raising or lowering of the plow beam with respect to the rear furrow wheel 31.

When the plow beam is to be lifted by power, the lever 50 connected to the power lift mechanism is pulled. Then, the crank 41 connected with the power lift swings to the right, as viewed in Figure 3, and causes a movement to the right of the extended member 40. Consequently, there is a clockwise turning of the links 36, sleeve 33 and axle 32, so as to bring the rear furrow wheel more nearly under the plow beam and raise the rear end of the plow beam about the land wheel as a pivot. Because of the connection of the depth adjusting mechanism on the front furrow wheel with the transverse sleeve portion 35 of the sleeve member 34 through the links 53 and 54 and the long link 56, the front end of the plow beam is raised with respect to the front furrow wheel at the same time that the rear end of the beam is raised. A piece 58, which incidentally forms a support for the power lift mechanism 42, has connected at one end a clevis member 59 and is itself secured to the Z-shaped member 28. Attached to the clevis 59 is a sleeve 60 and threaded within the sleeve is a rod 61 secured against longitudinal movement by means of a collar 62 supported in a bracket member 63 attached to the plow beam 10. A hand wheel 64 is secured to the end of the rod 61. An operator's seat 65 is shown in dotted lines over the plow beam 10 and is supported thereon by means of a bracket 66 and a connecting piece 67. It will be observed that the hand wheel 64, as well as the power lift lever 50, is within easy reach of the operator's seat 65. By turning of the hand wheel 64, a movement of the rod 61 in or out of the sleeve 60 is effected and, consequently, there is an angular movement of the Z-shaped member 28 with respect to the plow beam 10. A shifting of the Z-shaped member 28 with respect to the plow beam 10 produces a change in angle of the plow beam with respect to the line of travel of the plow in normal operation, and consequently a change in the angle of cut of the harrow elements 11. The angle of the plow beam in Figure 1 is greater with respect to the line of travel of the plow than the angle of the plow beam in Figure 2. Consequently, the plow, as positioned in Figure 3, will effect a greater width of cut. It is to be noted that the rear end of the draft member 23 connects at point 24 on the plow beam 10 and not with the Z-shaped member 28 or with a land wheel 49. Thus, even though there is an adjustment of the angle of the Z-shaped member 28 with respect to the plow beam 10, there is no effect of the adjustment upon the draft members.

It will be apparent from the foregoing description that a novel plow construction is provided in which the land wheel and rear furrow wheel are connected to opposite ends of a Z-shaped member which is pivotally secured to the rear end of the plow beam. By means of the novel sleeve and rod connection between the Z-shaped member and beam, a change in angular position in one with respect to the other may be easily effected. In this way, a change in the width of the cut of the harrow elements of the plow is brought about.

The intention is to limit the invention only within the terms of the appended claims.

What is claimed is:

1. A plow construction comprising a plow beam, a front furrow wheel at one end of the plow beam, a Z-shaped member pivotally connected between its ends to the other end of the beam, a land wheel at one end of the member, a rear furrow wheel at the other end, and means for shifting the angular position of the Z-shaped member with respect to the plow beam.

2. A plow construction comprising a plow beam, a front furrow wheel at one end of the plow beam, a Z-shaped member pivotally connected adjacent its mid-portion to the other end of the beam, a land wheel at one end of the member, a rear furrow wheel at the other end, and means for shifting the angular position of the Z-shaped member with respect to the plow beam, said means being connected at one end to the plow beam and at the other end to the Z-shaped member, both points of connection being substantially removed from the point of connection of the Z-shaped member and the plow beam.

3. A plow construction comprising a plow beam, a front furrow wheel connected to one end of the beam, a Z-shaped member connected at the other end, a land wheel at one end of the member, a rear furrow wheel at the other end, and means for varying the angular position of the Z-shaped member with respect to the plow beam, said means comprising a sleeve member connected to the Z-shaped member, a screw member connected to the plow beam and extending within the sleeve member, and a hand wheel on the end of the screw member.

4. A plow construction comprising a plow beam, a front furrow wheel, a rear furrow wheel, a land wheel, a member supported by the last two wheels and pivotally connected to one end of the plow beam, power lift means actuated by the land wheel for causing the rear furrow wheel to be lowered with respect to the beam for raising the beam about the land wheel as an axis, and means extending between the beam and the frame for varying the angular position of the beam with respect to the frame.

ALEXUS C. LINDGREN.
ARTHUR D. GALLAGHER.